United States Patent [19]
Preus et al.

[11] 3,862,040
[45] Jan. 21, 1975

[54] SEPARATOR FOR LIQUIDS OF DIFFERENT DENSITIES

[76] Inventors: Paul Preus, Smith Rd., Toms River, N.J. 08753; John J. Gallagher, 252 Burley Rd., Annapolis, Md. 21401

[22] Filed: Apr. 17, 1973

[21] Appl. No.: 352,021

[52] U.S. Cl. ............... 210/253, 210/254, 210/540, 210/DIG. 21
[51] Int. Cl. ............................................. B01d 23/00
[58] Field of Search ....... 210/83, 84, 253, 254, 259, 210/262, 320, 540, 542, DIG. 21

[56] References Cited
UNITED STATES PATENTS
2,620,926  12/1952  Helbig ............................. 210/83 X
3,630,368  12/1971  Lee .................................. 210/320 X
3,731,802  5/1973  James ............................... 210/84 X

*Primary Examiner*—Charles N. Hart
*Assistant Examiner*—Robert H. Spitzer
*Attorney, Agent, or Firm*—Harold L. Stowell

[57] ABSTRACT

A separator for liquids of different densities including a skimmer for separating the liquids, a separating tank for holding the more dense liquid from the skimmer and a concentrating tank to receive the less dense liquid from the skimmer.

2 Claims, 4 Drawing Figures

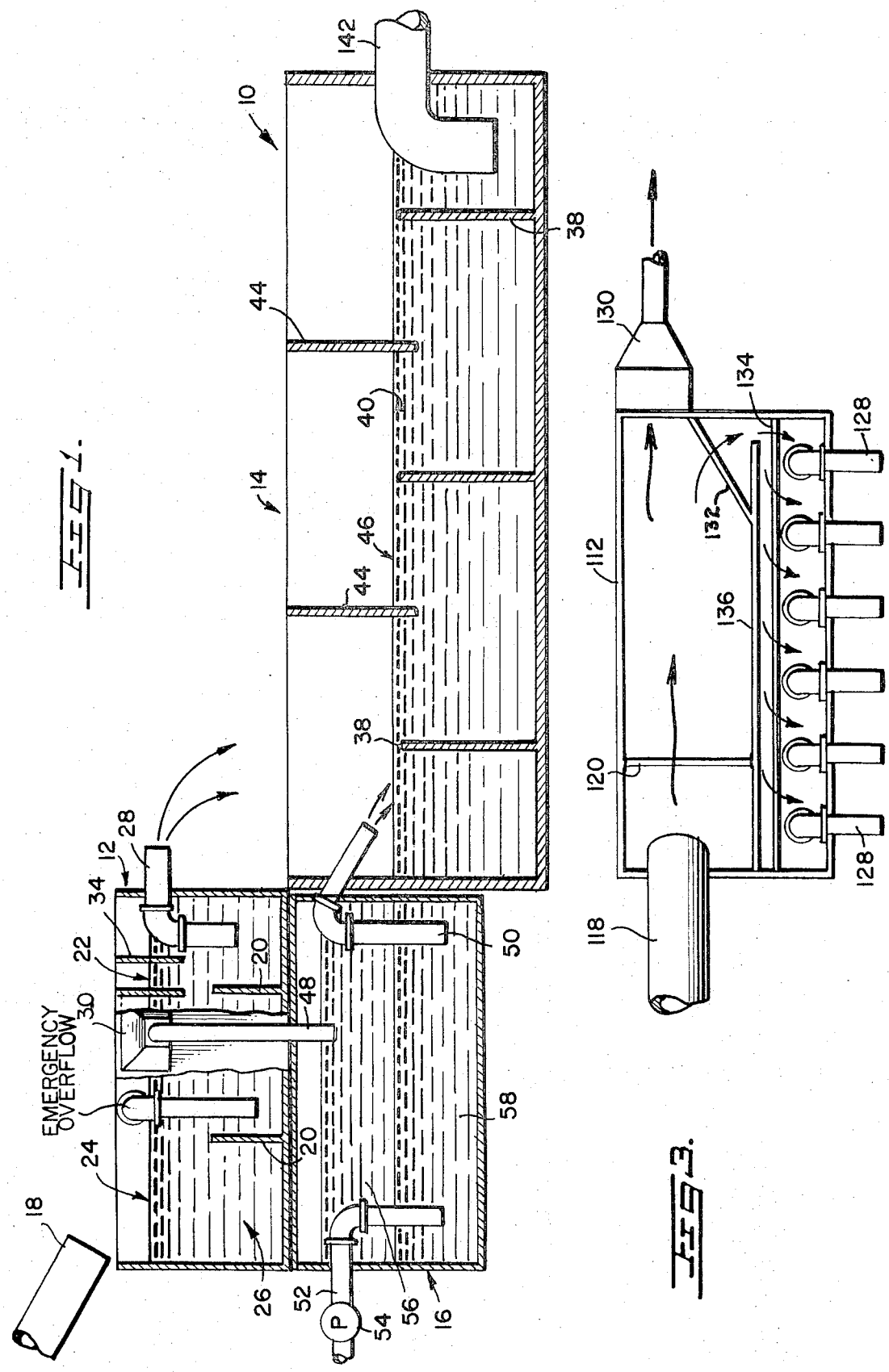

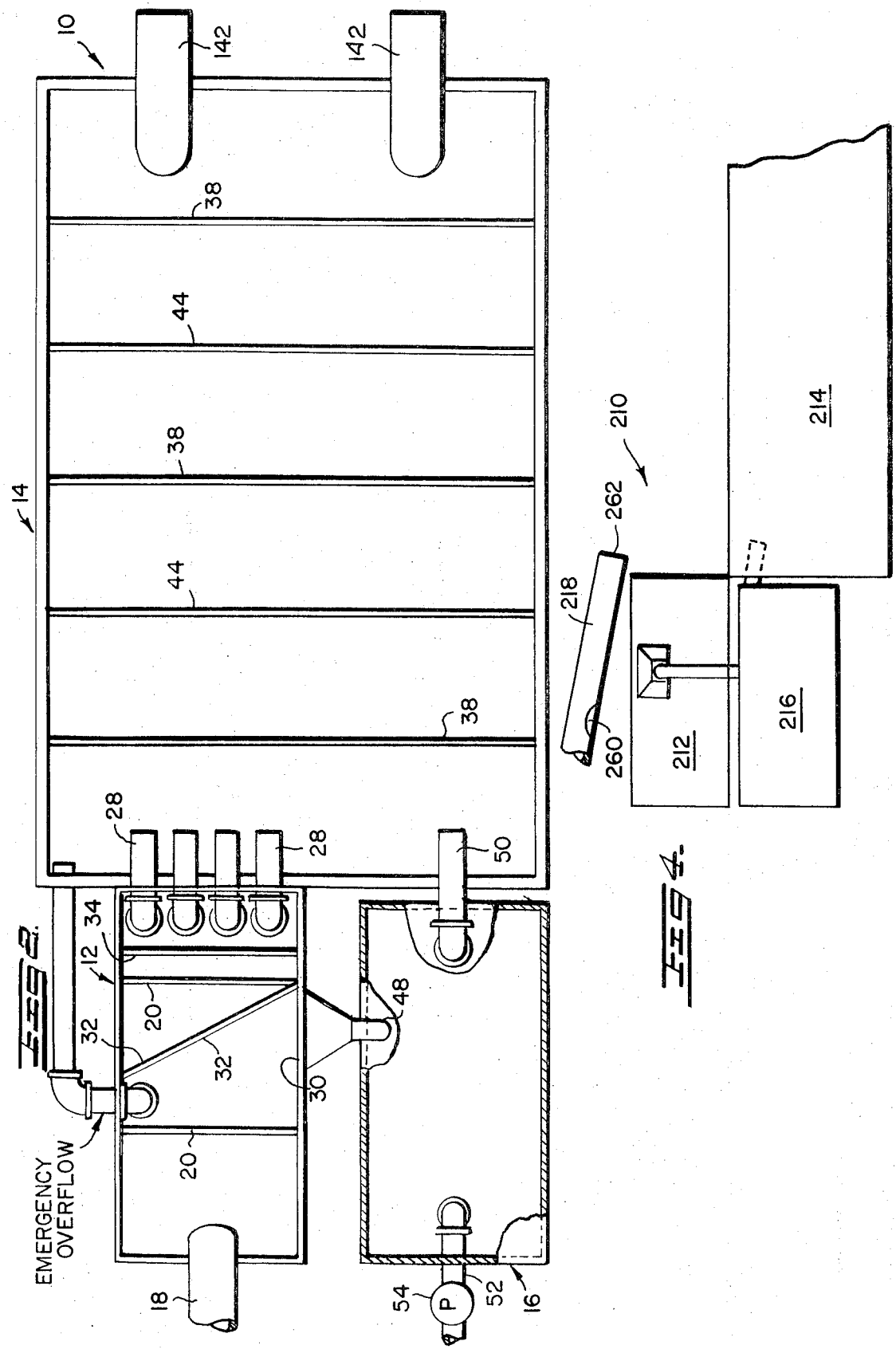

SEPARATOR FOR LIQUIDS OF DIFFERENT DENSITIES

BACKGROUND OF THE INVENTION

The separation of less dense fluids from more dense fluids is readily accomplished by allowing the fluids to stratify according to their respective densities and then taking off either the top fluid or the bottom fluid. The former technique is known as "skimming," and the latter is generally referred to as "decanting." The "skimming" technique is theoretically well suited for separation of hydrocarbons from water, however, even the most effective skimmers operating under ideal conditions have a practical efficiency approaching about 50 percent (e.g. the yield is about 50 percent water).

A very practical application of a separator of the type described therein is in the separation of hydrocarbons from the effluent of processes involving the use of water and hydrocarbons or from the effluent of installations where there is danger of accidental discharge of hydrocarbons. Such separators have gained increased importance in preventing pollution of waterways into which the effluent is discharged.

In fixed, relatively permanent installations, gravity skimmers, generally of the wier type, have been found to be of the best utility. Mechanical skimmers, although suitable for this type of separator, require frequent maintenance and constant attention for effective operation; and, in the event of malfunction, generally cause a breakdown of the separator with attendant loss of product before the malfunction is discovered. It is more usually the case that pollution of the waterway into which the installation's effluent is discharged reveals the breakdown of the mechanical skimmer.

Gravity type separators, on the other hand, are very sensitive to fluid flow, their effeciency decreasing as a function of the magnitude of the fluid flow rate. This factor is of great importance in separators treating effluent where the flow rate of effluent is subject to wide fluctuation such, for example, where the effluent includes store drain systems or where the effluent is open to the surface water runoff.

SUMMARY OF THE INVENTION

This invention relates to the separator for liquids of different densities which is adapted to function at constant high efficiency regardless of fluctuation of liquid flow.

The invention provides a separator adapted to function for relatively long periods of time with a minimum of attention and which is adapted to "fail safe" in the event of malfunction of any of the components thereof.

In a preferred embodiment the invention provides a separator having a skimmer which feeds the more dense constituent thereof into a gravity separator and the less dense constituent with inadvertant parts of the more dense constituent into a gravity concentrating tank from which the parts of the more dense constituent are decanted by gravity flow back to the gravity separator.

Other objects and advantages of this invention will become better understood to those skilled in the art by reference to the following detailed description when viewed in light of the accompanying drawings wherein like components throughout the Figures are indicated by like numerals and wherein:

BRIEF DESCRIPTION OF THE DRAWING

FIG. 1 is an elevational view in section of a separator embodying the features of this invention.

FIG. 2 is a plan view of the separator of FIG. 1.

FIG. 3 is a plan view of a variation of a portion of the device of FIGS. 1 and 2.

FIG. 4 is another variation of the invention as illustrated in FIGS. 1 and 2.

DESCRIPTION OF A PREFERRED EMBODIMENT

In FIG. 1, the separator 10 comprises a skimmer tank 12, communicating with a separating tank 14 and a concentrating tank 16.

An effluent discharge line 18 feeds one end of the skimmer tank 12 with liquid containing water and a less dense hydrocarbon component. The skimmer tank 12 is provided with a series of baffles 20 extending upwardly from the bottom to a point below the surface 22 of the liquid in the tank. The hydrocarbon component separates out, due to its lower density, as a layer 24 on top of the water 26 in the tank. A series of 90° elbow discharge pipes 28 are disposed through a wall of the skimmer tank 12 opposite the effluent discharge line 18 with the lower ends of the vertical segment thereof disposed in spaced relationship to the bottom of the tank at a point below the level of the upper edge of the baffle 20. The vertical disposition of the horizontal segment of the elbow 28 determine the liquid level 22, and should therefore be disposed above the level of the upper edge of the baffle 20. The size and number of discharge pipes 28 are determined by the maximum quantity of effluent anticipated from the discharge line 18, the multiple pipes 28 being required to provide a maximum variation in liquid processed with a minimum variation in liquid level 22.

The plural pipes 28 could obviously be replaced with a single discharge device such, for example, as a rectangular cross sectional duct conforming to the general discharge configuration provided by the plural pipes if so desired. A wier skimmer 30 is provided in the side of the skimmer tank 12 at the level of the liquid surface 22. The wier lip should be disposed, with relation to the lower surface of the horizontal component of the discharge pipes 28 such that the lip is between ¼ and ½ inches below the liquid surface 22 during optimum flow conditions. A vertically adjustable lip (not shown) may be provided for the purpose of obtaining this disposition.

Other types of skimmers such as mechanical pump skimmers, belt or roller skimmers, or other kinds of wier skimmers; such, for example, as slotted tube type skimmers, can be substituted for the wier skimmer specifically disclosed without altering the basic operation of the invention.

An inverted wier 32 is disposed in the skimmer tank 12 to intersect the surface of the liquid 22, and oriented to channel the hydrocarbon layer 24 into the skimmer wier 30. A second inverted wier 34 is disposed to similarly intersect the liquid surface 22 upstream of the discharge pipes 28. The number and disposition of the inverted wier and baffles may be changed as the particular installation requires. The primary purpose of these components is to provide a maximum travel path for liquid to flow through the skimmer tank 26 with a suitable number of changes in direction to preclude entrainment of hydrocarbons in the liquid flow and permit separation out of the hydrocarbons to the liquid surface. The particular configuration of each installation depends upon the rate of discharge effluent and the amount of mechanical mixing and emulsion which exists in the effluent.

In FIG. 3 an example of reorientation and variation of the skimmer tank of FIGS. 1 and 2 for maximum flow path for removal of highly mixed and/or mechanically emulsified hydrocarbons is shown. In this figure, components equivalent to like components of FIGS. 1 and 2 are indicated by the same numeral only of the next higher order. The primary variation is a reorientation of the discharge pipes 128, exchanging their position with skimmer wier 130. A longer flow path to the discharge pipes 128 is provided by a full height baffle 136 which extends from the bottom of the tank 112 to at least intersect the liquid surface at its highest possible level. This provides a flow path, as shown by arrows in FIG. 3, which extends the length of the tank 112 to the skimmer wier 130, and then around behind the baffle 132 (under the inverted wiers 132 and 134) for discharge through the pipes 128. Such a variation would, of course, require repositioning of the skimmer tank 112 so that discharge would be into the corresponding separating tank (not shown).

Returning to FIGS. 1 and 2, discharge of the major portion of the water from the skimmer tank 12 through the discharge pipes 28 is directed into one end of the separating tank 14. The separating tank 14 is provided with a series of baffles 38 extending similarly to those of the skimmer tank 12 from the bottom of the tank 14 to a point below the surface of the water 40. Discharge conduits 142, having 90° elbows and of suitable size and number to handle the anticipated maximum effluent discharge volume, are placed in the same manner and for a similar purpose as the discharge pipes 28 of the skimmer tank 12. A series of inverted wiers 44 are disposed to intersect the water surface 40. The inverted wiers and baffles 44 and 38 serve the same purpose and function in the same manner as those of the skimmer tank 12; and, as described above, may similarly be varied and reoriented to accomodate particular requirements of specific installations. The primary function of the separation tank 14 is to serve as a backup for the skimmer tank 12 and associated systems in the event of malfunction or overloading thereof, and to remove traces of hydrocarbons which may occasionally escape from the skimmer tank. In this respect, a bouyant oleophilic-hydrophobic material 46 such, for example, as the particulate, fiberous material marketed under the trademark, Sorbent C, by Clean Water, Inc., of Toms River, New Jersey, be maintained on the water surface 40 to absorb traces of hydrocarbons in the separator tank 14, and to act as a tell-tale to indicate malfunction or overloading of the skimmer tank 12 or associated systems. Saturated sorbent material may be removed periodically by vacuum device, nets or the like.

The skimmer wier 30 discharges through a conduit 48 into the concentrating tank 16. The tank 16 is provided with a decanting line 50 which extends from the point proximate the bottom thereof vertically to a point proximate the top thereof, and then horizontally out through one end to discharge into the separating tank 14. The horizontal component of the decanting line 50 is preferably sloped downward for at least a portion thereof to facilitate discharge there through into tank 14. The spacing of the lower end of the vertical component of the line 50 from the bottom of the tank should be minimum consistent with keeping the inlet clear of debris and silting in the tank 16. A discharge line 52, preferably having means, such as a pump 54 for facilitating discharge, is dispoded in the other end of the tank 16. The discharge line 52 could possibly be valved and sloped, in a manner similar to the decanting line 50, to provide for gravity discharge into a storage tank or the like if so desired.

In operation, hydrocarbons and water, skimmed from the liquid in the skimmer tank 12, enter the condensing tank 16 and stratify under the influence of gravity into a hydrocarbon layer 56 on a water base 58. As indicated above, the ration may be on the order of 58% water or higher so that, as the tank 16 fills, a considerable base of water is present therein. As the liquid level in the tank 16 reaches the horizontal component of the decanting line 50, liquid will start to flow through the decanting line into the separating tank 14 under the influence of gravity. Due to the placement of the intake of the decanting line 50, this liquid will be water until the water base 58 is almost entirely decanted at which point the tank will contain almost pure concentrated hydrocarbons. By periodic checks of the hydrocarbon level in the tank 16, or by observation of the discharge from the decanting line 50, the tank 16 can be then pumped or discharged through discharge line 52 for final removal of the hydrocarbons.

In the event the separator is to be installed in effluent discharges subject to appreciable quantities of surface run off, skimmer bypass provision should be made for unusually heavy rainstorms since skimmers can only be economically designed for effective operation for reasonable variations from normal flow.

Utilizing the separator tank for a backup then, a bypass system such as shown in FIG. 4 can be utilized to accomodate unusually high effluent discharge rates. In this Figure components corresponding to like components of FIGS. 1 and 2 are indicated by the same numeral only of two orders higher.

The effluent discharge line 218 extends over the skimmer tank 212 to place the discharge thereof 262 over the separator tank 214. An orifice 260 is formed in the bottom of the line 218 over the skimmer tank 212. The size and orientation of the orifice is such that, within limits, normal flows in the line will discharge there through into the skimmer tank 212 for processing as described above. When flow in the line 218 becomes too great for the orifice 260 to handle, (a rate which can be designed to be equal to the maximum handleable by the skimmer tank 212), the excess flow is bypassed to the separator tank 214 to be handled thereby. Hydrocarbons thus bypassing will stratify in the tank 214 for absorption in the sorbent material described above for subsequent removal.

The size of the separating tank 14 will be determined by the specific conditions at the particular installation as was described above for the skimmer tank 12. For example, to give liquid in the tank for a desired dwell time for maximum practical flow, the volume of the tank can be computed by determining the maximum expected hourly flow (i.e., local conditions, 10 year storm values, drainage area, etc.) and by multiplying the desired dwell time within the tank. In an installation in Alexandria, Virginia, for example, a separator tank, 10 by 20 by 6 feet, having an 18 inch primary discharge conduit suitably held hydrocarbons during what amounted to be over a 100 year storm for that area.

What has been set forth above is intended to be exemplary to enable those skilled in the art to pratice the invention.

What is new and therefore desired to be protected by Letters Patent of the United States is:

1. A device for separating liquids of different densities in flow streams subjected to periodic increase above normal flow rate comprising:
   a first separator for receiving and separating the liquids at said normal flow rate including means to conduct the liquids thereto:
   a second separator for separating the liquids at flow rates above normal;
   concentrating means having a bottom and including means for transmitting the less dense liquid with components of the more dense liquid separated by said first separator thereto, and means for separating and transmitting components of the more dense liquid from said concentrating means to said second separator;
   and means to bypass said first separator and conduct the inflow of liquids to said second separator at flow rates above normal.

2. A device in accordance with claim 1 wherein said means for separating comprises decanting means connecting the bottom of said concentrating means to said second separator.

* * * * *